(12) United States Patent
Sato

(10) Patent No.: US 10,272,943 B2
(45) Date of Patent: Apr. 30, 2019

(54) CONTROL UNIT FOR VEHICLE AND CONTROL METHOD FOR VEHICLE

(71) Applicant: SUBARU CORPORATION, Tokyo (JP)

(72) Inventor: Yutaka Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 98 days.

(21) Appl. No.: 15/646,253

(22) Filed: Jul. 11, 2017

(65) Prior Publication Data

US 2018/0086374 A1 Mar. 29, 2018

(30) Foreign Application Priority Data

Sep. 23, 2016 (JP) ................. 2016-185703

(51) Int. Cl.
*B62D 1/04* (2006.01)
*B62D 1/16* (2006.01)
(Continued)

(52) U.S. Cl.
CPC .......... *B62D 6/005* (2013.01); *B60L 11/1803* (2013.01); *B60L 11/1805* (2013.01); *B60W 30/045* (2013.01); *B62D 1/046* (2013.01); *B62D 1/166* (2013.01); *B62D 1/20* (2013.01); *B62D 6/002* (2013.01); *B62D 6/003* (2013.01); *B62D 6/008* (2013.01); *B62D 6/10* (2013.01); *B60L 2200/46* (2013.01); *B60L 2240/16* (2013.01);
(Continued)

(58) Field of Classification Search
CPC ........ B62D 6/005; B62D 1/046; B62D 1/166; B62D 1/20; B62D 6/002; B62D 6/003; B62D 6/008; B62D 6/10; B60L 11/1803; B60L 11/1805; B60L 2200/46; B60L 2240/18; B60L 2240/16; B60L 2240/22; B60L 2260/28; B60W 30/045; Y02T 10/7005

See application file for complete search history.

(56) References Cited

U.S. PATENT DOCUMENTS 5,762,157 A * 6/1998 Uehara ............... B60T 8/17552
180/197
6,415,215 B1 * 7/2002 Nishizaki .............. B60T 8/1755
180/167

(Continued)

FOREIGN PATENT DOCUMENTS

JP 2007160998 A 6/2007

*Primary Examiner* — Nicholas Kiswanto
(74) *Attorney, Agent, or Firm* — Chip Law Group

(57) ABSTRACT

A control unit for a vehicle having an active steering system capable of changing a steering gear ratio between a steering angle of a steering wheel and a tire steering angle includes a steering turning assist controller and a left-right driving force controller. The steering turning assist controller controls the steering gear ratio so that a yaw rate generated by the vehicle becomes a target yaw rate to assist a turning of the vehicle. The left-right driving force controller controls, in the left and right electric drive wheels which each add a yaw moment to a vehicle body independently of a steering system and are able to be independently driven, driving forces of the electric drive wheels so that the yaw rate generated by the vehicle becomes the target yaw rate based on a roll of the vehicle.

18 Claims, 12 Drawing Sheets

(51) Int. Cl.
    *B62D 1/20*       (2006.01)
    *B62D 6/00*       (2006.01)
    *B62D 6/10*       (2006.01)
    *B60L 11/18*      (2006.01)
    *B60W 30/045*    (2012.01)

(52) U.S. Cl.
    CPC ....... *B60L 2240/18* (2013.01); *B60L 2240/22* (2013.01); *B60L 2260/28* (2013.01); *Y02T 10/7005* (2013.01)

(56) References Cited

U.S. PATENT DOCUMENTS

| | | | |
|---|---|---|---|
| 7,987,029 B2 * | 7/2011 | Takenaka | B60T 8/1755 |
| | | | 116/36 |
| 8,255,120 B2 * | 8/2012 | Mikuriya | B62D 6/002 |
| | | | 701/42 |
| 9,199,639 B2 * | 12/2015 | Yamakado | B60T 8/1755 |
| 9,789,905 B2 * | 10/2017 | Matsuno | B62D 15/025 |
| 10,005,455 B2 * | 6/2018 | Hulten | B62D 6/003 |
| 2006/0041364 A1 * | 2/2006 | Tsukasaki | B60T 8/1755 |
| | | | 701/69 |
| 2010/0114449 A1 * | 5/2010 | Shiozawa | B60L 3/10 |
| | | | 701/90 |
| 2018/0208184 A1 * | 7/2018 | Sugai | B60W 30/02 |
| 2018/0273024 A1 * | 9/2018 | Umetsu | B60W 30/02 |
| 2018/0304768 A1 * | 10/2018 | Suzuki | B60W 40/114 |

* cited by examiner

CONTROL UNIT FOR VEHICLE AND CONTROL METHOD FOR VEHICLE

CROSS-REFERENCE TO RELATED APPLICATIONS

The present application claims priority from Japanese Patent Application No. 2016-185703 filed on Sep. 23, 2016, the entire contents of which are hereby incorporated by reference.

BACKGROUND

1. Technical Field

The present invention relates to a control unit for a vehicle and a control method for a vehicle.

2. Related Art

Conventionally, for instance, in Japanese Unexamined Patent Application Publication (JP-A) No. 2007-160998, a technology in which controlling a steering assist force or a steering angle of a steering wheel and controlling a front-and-rear-wheel distribution ratio of roll rigidity of the vehicle or a braking and driving force difference between left and right wheels are appropriately combined so that a steering feeling is improved by restraining a position of a steering input from fluctuating in an unnatural manner and restraining an actual moving direction of a vehicle from deviating from the position of the steering input has been described.

However, when a tire steering angle of the steering wheel is excessively increased with respect to a steering angle by a driver, the roll of a vehicle increases as a tire lateral force increases. Then, there is a problem in that ride comfort is degraded as the roll increases. In the technology described in JP-A No. 2007-160998, it is assumed that the vehicle is made to travel satisfactorily along a target travel route while the position of the steering input is restrained from fluctuating in an unnatural manner and the actual moving direction of the vehicle is restrained from deviating from the position of the steering input. However, it is difficult to reliably restrain an increase in the roll and improve turning performance of the vehicle at the same time.

SUMMARY OF THE INVENTION

It is desirable to provide a novel and improved control unit for a vehicle and a control method for the vehicle in which drivability can be improved by optimally controlling the roll of a vehicle in a vehicle equipped with an active steering system capable of changing a steering gear ratio.

An aspect of the present invention provides a control unit for a vehicle including an active steering system capable of changing a steering gear ratio between a steering angle of a steering wheel and a tire steering angle. The control unit includes: a steering turning assist controller configured to control the steering gear ratio so that a yaw rate generated by the vehicle becomes a target yaw rate to assist a turning of the vehicle; and a left-right driving force controller configured to control, in left and right electric drive wheels which each add a yaw moment to a vehicle body independently of a steering system and are able to be independently driven, driving forces of the electric drive wheels so that the yaw rate generated by the vehicle becomes the target yaw rate based on a roll of the vehicle.

When the roll of the vehicle is less than a predetermined condition, the steering turning assist controller may control the steering gear ratio so that an additional tire steering angle which corresponds to a difference between the yaw rate generated by the vehicle and the target yaw rate is added.

When the roll of the vehicle is less than the predetermined condition, the left-right driving force controller may not generate a yaw rate by controlling the driving forces of the electric drive wheels.

When the roll of the vehicle exceeds the predetermined condition, the steering turning assist controller may control the steering gear ratio so that a tire steering angle which corresponds to a steering angle of a driver is added.

When the roll of the vehicle exceeds the predetermined condition, the left-right driving force controller may generate a yaw rate by controlling the driving forces of the electric drive wheels.

When the roll of the vehicle exceeds the predetermined condition, the left-right driving force controller may generate at least a part of a yaw rate that is attempted to be generated by the steering turning assist controller, by controlling the driving forces of the electric drive wheels.

The predetermined condition may be a condition in which a value of a turning assist roll rate when a turning assist is performed by the steering turning assist controller is equal to or greater than a value of a target roll rate when no turning assist is performed by the steering turning assist controller.

The predetermined condition may be a condition in which a value obtained by multiplying the value of the turning assist roll rate by a gain obtained from a ratio of a yaw rate to a roll rate of the vehicle is equal to or greater than the value of the target roll rate.

The gain may be greater as the ratio is smaller.

Another aspect of the present invention provides a control method for a vehicle including an active steering system capable of changing a steering gear ratio between a steering angle of a steering wheel and a tire steering angle. The control method includes: controlling the steering gear ratio so that a yaw rate generated by the vehicle becomes a target yaw rate to assist a turning of the vehicle; and controlling, in left and right electric drive wheels which each add a yaw moment to a vehicle body independently of a steering system and are able to be independently driven, driving forces of the electric drive wheels so that the yaw rate generated by the vehicle becomes the target yaw rate based on a roll of the vehicle.

BRIEF DESCRIPTION OF THE DRAWINGS

FIG. 10 is a schematic diagram illustrating a gain map used when a weighting gain calculator calculates a weighting gain a;

DETAILED DESCRIPTION

Figure 1:
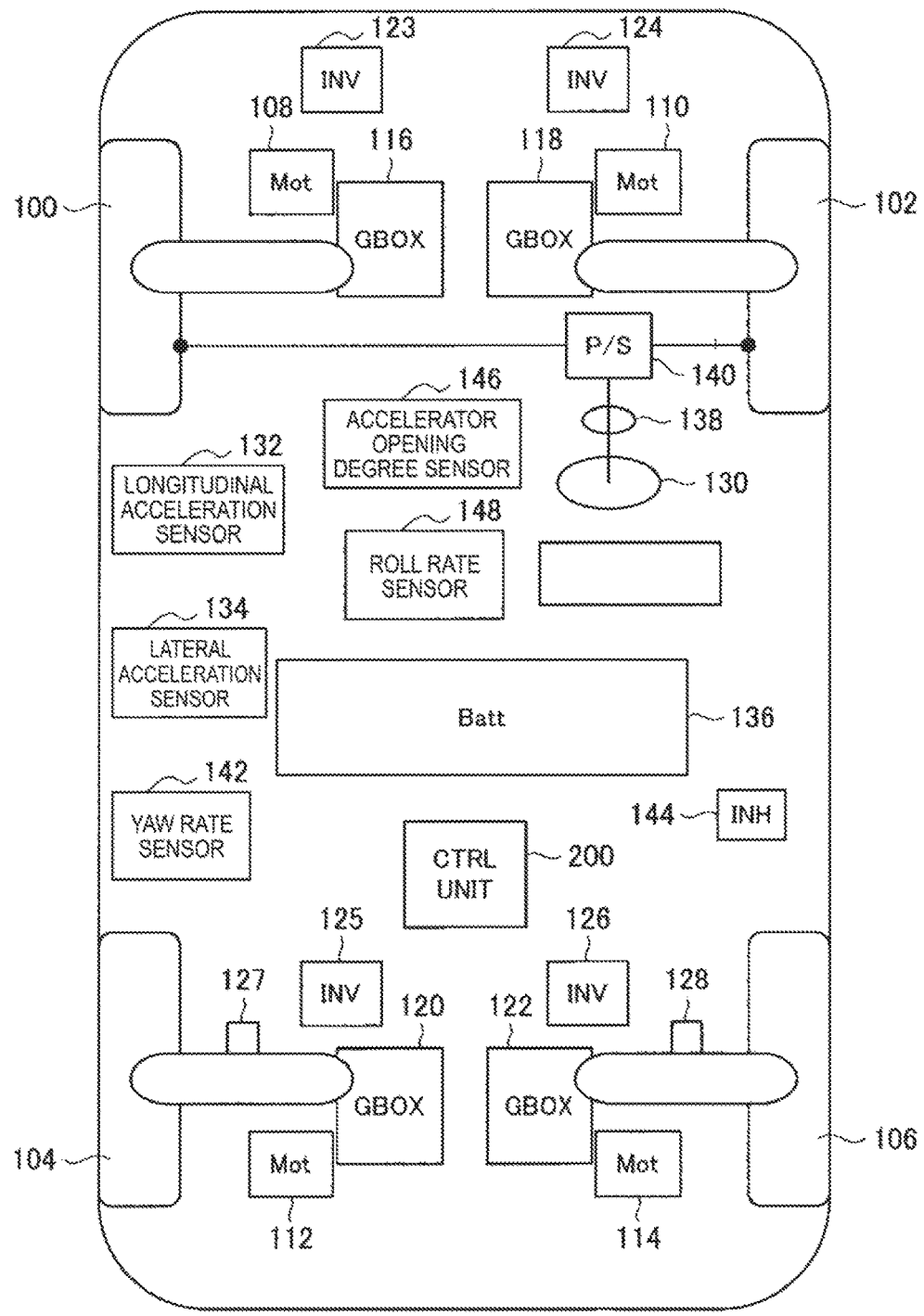
FIG. 1 is a schematic diagram illustrating a vehicle according to an example of the present invention.

Hereinafter, preferred examples of the present invention will be described in detail with reference to the appended drawings. Note that, in this specification and the appended drawings, structural elements that have substantially the same function and structure are denoted with the same reference numerals, and repeated description of these structural elements is omitted.

First of all, the structure of a vehicle 1000 according to an example of the present invention will be described with reference to FIG. 1. FIG. 1 is a schematic diagram illustrating the vehicle 1000 according to the present example. As illustrated in FIG. 1, the vehicle 1000 includes front wheels 100 and 102, rear wheels 104 and 106, driving force generators (i.e., motors) 108, 110, 112, and 114 that respectively drive the front wheels 100 and 102 and the rear wheels 104 and 106, gearboxes 116, 118, 120, and 122 that respectively transfer the driving forces of the motors 108, 110, 112, and 114 to the front wheels 100 and 102 and the rear wheels 104 and 106, inverters 123, 124, 125, and 126 that respectively control the motors 108, 110, 112, and 114, wheel speed sensors 127 and 128 that respectively detect the wheel speeds (i.e., vehicle velocity V) of the rear wheels 104 and 106, a steering wheel 130 that steers the front wheels 100 and 102, a longitudinal acceleration sensor 132, a lateral acceleration sensor 134, a battery 136, a steering wheel angle sensor 138, a power steering mechanism 140, a yaw rate sensor 142, an inhibitor position sensor (IHN) 144, an accelerator opening degree sensor 146, a roll rate sensor 148, and a control unit (i.e., a controller) 200.

The vehicle 1000 according to the present example is equipped with the motors 108, 110, 112, and 114 for respectively driving the front wheels 100 and 102 and the rear wheels 104 and 106. Accordingly, it is possible to control the driving torque at each of the front wheels 100 and 102 and the rear wheels 104 and 106. Therefore, driving each of the front wheels 100 and 102 and the rear wheels 104 and 106 can generate a yaw rate through torque vectoring control independently of generation of a yaw rate by steering of the front wheels 100 and 102, and assistance in a steering operation can thus be provided.

The driving of the motors 108, 110, 112, and 114 is controlled by controlling the inverters 123, 124, 125, and 126 corresponding to the motors 108, 110, 112, and 114, respectively, based on instructions from the control unit 200. The driving forces of the motors 108, 110, 112, and 114 are transferred to the front wheels 100 and 102 and the rear wheels 104 and 106, respectively, through the respective gearboxes 116, 118, 120, and 122. Each of the motors 108, 110, 112, and 114 and the inverters 123, 124, 125, and 126 used in the vehicle 1000 is highly responsive, and the vehicle 1000 is capable of driving the right and left wheels independently. In the vehicle 1000 as described above, the turning moment (i.e., the yaw moment) can be controlled based on the vehicle-turning angular velocity (i.e., the yaw rate) to carry out the turn assist control, that is, to provide assistance in the steering operation.

The power steering mechanism 140 controls the steering angles of the front wheels 100 and 102 through torque control or angle control in accordance with an operation of the steering wheel 130 by a driver. The steering wheel angle sensor 138 measures a steering wheel angle θh input by the driver operating the steering wheel 130. The yaw rate sensor 142 measures an actual yaw rate γ of the vehicle 1000. The wheel speed sensors 127 and 128 measure the vehicle velocity V of the vehicle 1000.

Figure 2:
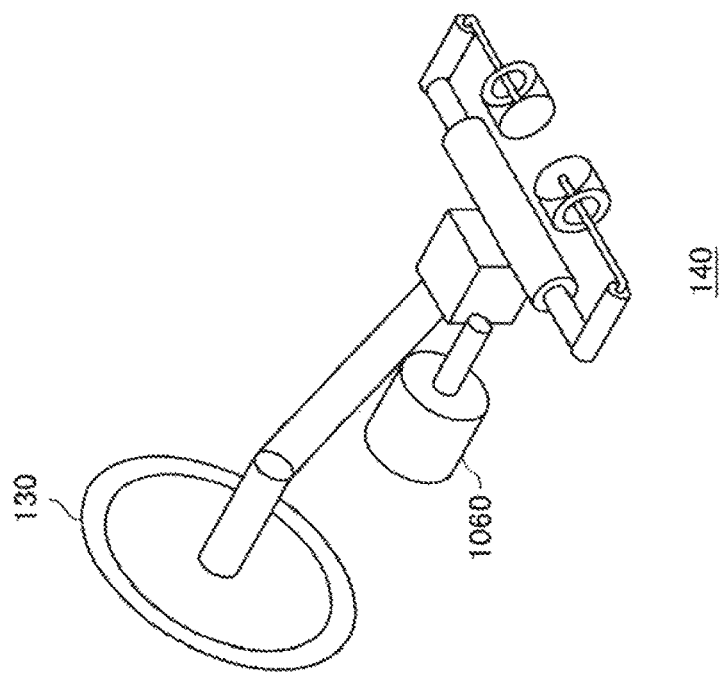
FIG. 2 is a schematic diagram illustrating a power steering mechanism included in the vehicle according to the present example.
Figure 2:
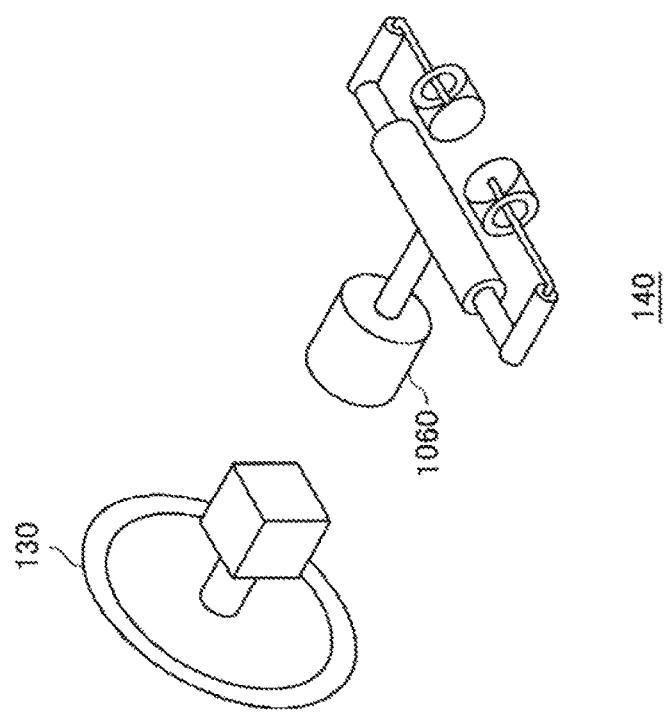

FIG. 2 is a schematic diagram illustrating the power steering mechanism 140 (steering system) included in the vehicle 1000 according to the present example. The vehicle 1000 according to the present example includes a steer-by-wire system or an active steering system as illustrated in FIG. 2 as the steering system. The front wheels 100 and 102 are steered by the driving force of an electric power steering motor (EPS motor) 1060, and the electric power steering motor 1060 is driven by power obtained by the DC/DC converter stepping down the voltage of the high-voltage battery in any of the systems. The control over the torque of the electric power steering motor 1060 makes it possible to change how much the vehicle 1000 turns in accordance with a predetermined steering operation amount of the driver. It is possible to implement a steering system in which an amount of change in a steering angle θh and an amount of change in a tire steering angle δ are not uniform (hereinafter, commonly referred to as an active steering system or abbreviated as active steer).

The vehicle 1000 according to the present example is an electric vehicle that independently controls braking and driving of front, rear, left, and right wheels. However, the present example is not limited to this mode and may be a vehicle in which only the front wheels 100 and 102 or the rear wheels 104 and 106 independently generate a driving force. Also note that the present invention is not limited to the torque vectoring control with driving force control, and that another example of the present invention may be applied to, for example, a four-wheel steering system in which the steering angles of the rear wheels are controlled.

The active steering system has a purpose of improving the steering performance. At high speed, a gain of a steering angle is lowered to improve stability, and at low speed, the steering amount of the driver is reduced and the gain is increased to improve operability. However, the gain is increased to improve the steering performance even at medium-high speed in some cases. Here, because the tire steering angle is increased and the tire sliding angle (which is also referred to as tire slip angle) is increased, the roll motion increases with respect to the passenger compartment side in proportion to an increase in lateral acceleration, and the ride comfort is degraded.

Figure 3:
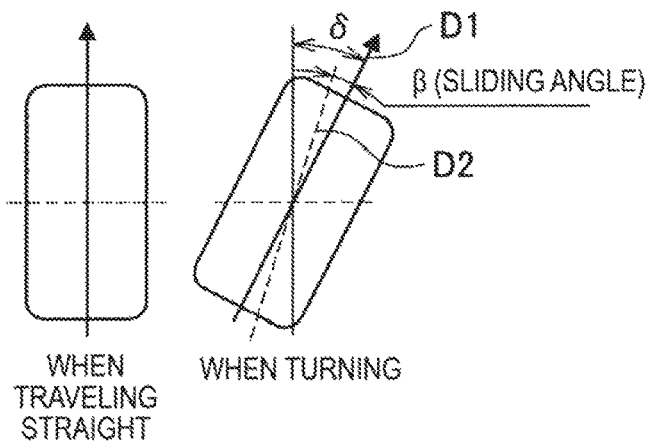
FIG. 3 is a schematic diagram for describing a tire sliding angle.
Figure 4:
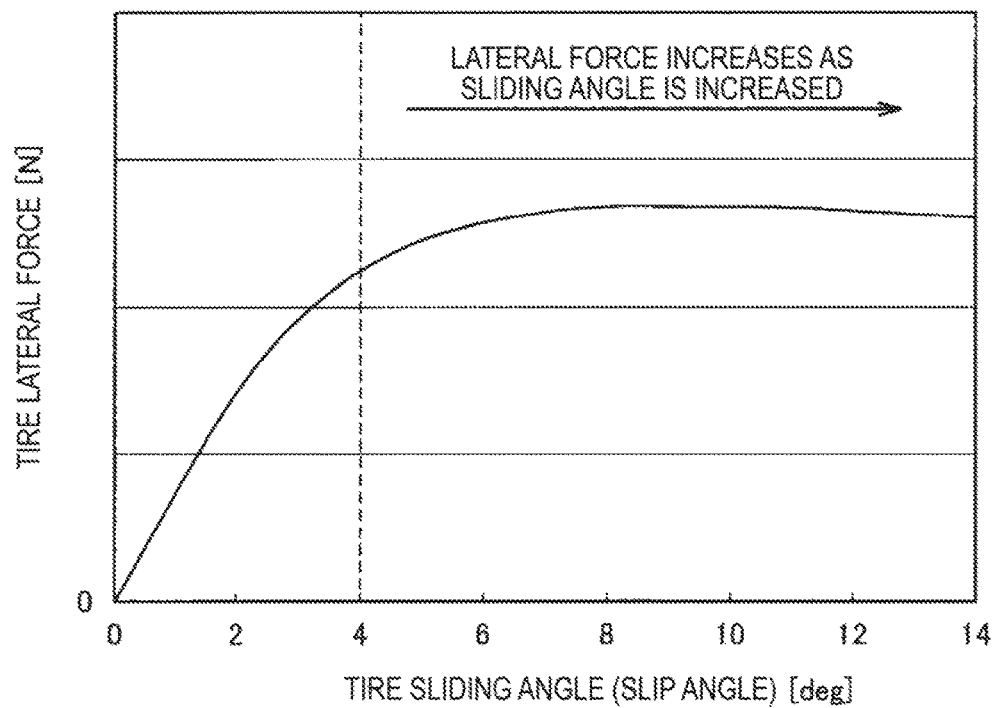
FIG. 4 is a characteristic diagram illustrating a relationship between the tire sliding angle and a tire lateral force.

FIG. 3 is a schematic diagram for describing a tire sliding angle. The tire sliding angle is an angle β formed by a direction D1 in which a tire faces and a direction D2 in which the tire actually advances. Also, δ illustrated in FIG. 3 indicates the tire steering angle. FIG. 4 is a characteristics diagram illustrating a relationship between the tire sliding angle and a tire lateral force. As illustrated in FIG. 4, the tire lateral force increases as the tire sliding angle is increased, and this result also affects the roll motion. Because the roll angle of the roll motion has a proportional relationship with the lateral acceleration in terms of vehicle dynamics, when the gain of the steering angle is increased and the turning performance is improved, the roll angle affects the roll, and the ride comfort is degraded as a result. As described above, the steering performance and the ride comfort have an antinomic relationship, and the ride comfort is degraded when the steering performance is emphasized and the steering performance is degraded when the ride comfort is emphasized in the active steering system.

Figure 5A:
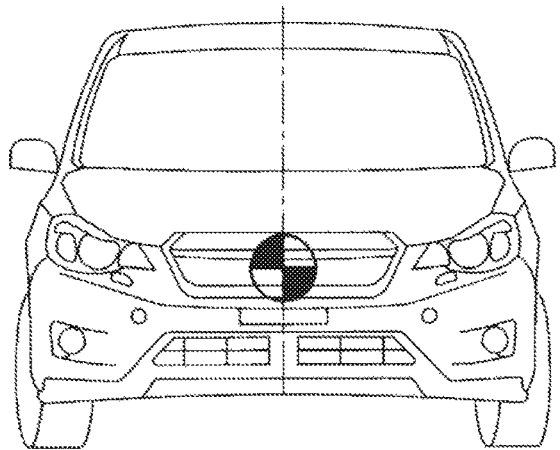
FIG. 5A is a schematic diagram illustrating a relationship between the roll of a vehicle, steering, and turning by front, rear, left, right wheels.
Figure 5B:
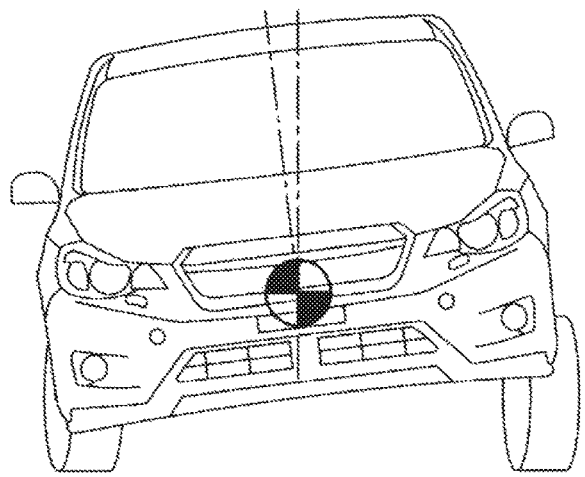
FIG. 5B is a schematic diagram illustrating a relationship between the roll of a vehicle, steering, and turning by front, rear, left, right wheels.
Figure 5C:
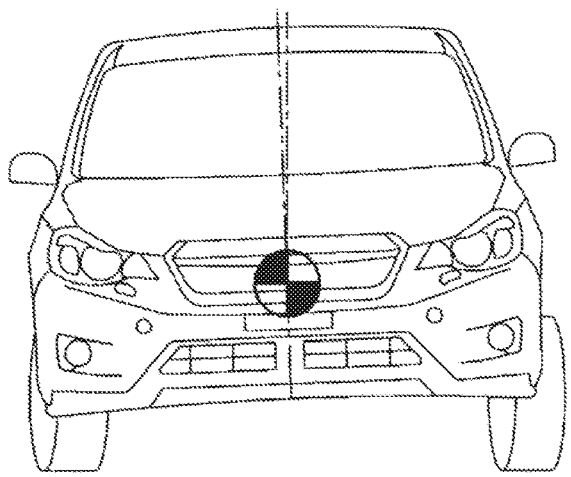
FIG. 5C is a schematic diagram illustrating a relationship between the roll of a vehicle, steering, and turning by front, rear, left, right wheels.
Figure 6A:
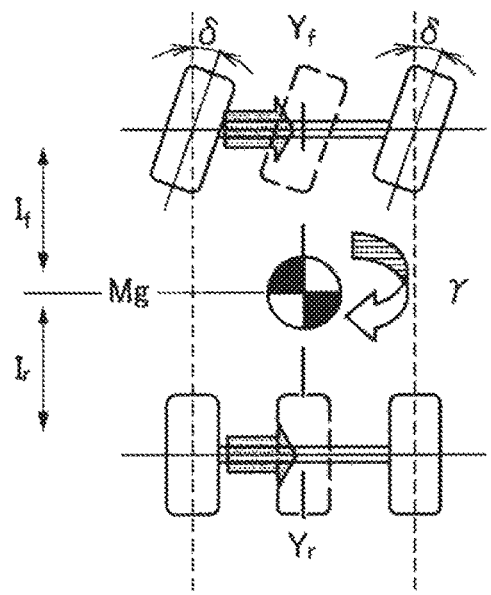
FIG. 6A is a schematic diagram illustrating a state in which a tire steering angle, a turning moment, and a yaw rate are generated in FIG. 5A.
Figure 6B:
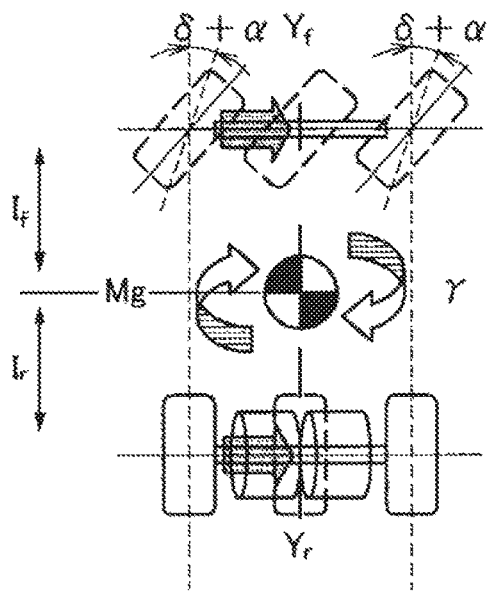
FIG. 6B is a schematic diagram illustrating a state in which a tire steering angle, a turning moment, and a yaw rate are generated in FIG. 5B.
Figure 6C:
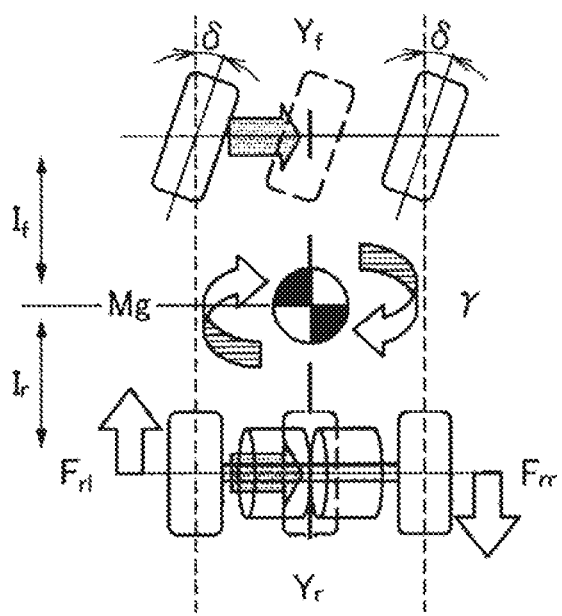
FIG. 6C is a schematic diagram illustrating a state in which a tire steering angle, a turning moment, and a yaw rate are generated in FIG. 5C.

FIGS. 5A to 5C are schematic diagrams illustrating a relationship between the roll of a vehicle, steering, and turning by front, rear, left, right wheels. FIG. 5A illustrates a behavior of a vehicle when the vehicle is turning at a low speed with a relatively large turning radius R. FIG. 5B illustrates a behavior of the vehicle during a control for improving the steering performance by the active steering system. Further, FIG. 5C illustrates a behavior of the vehicle during a control for improving the steering performance using the active steering system and left-and-right independent braking/driving force control of the rear wheels. FIGS. 6A to 6C are schematic diagrams corresponding to FIGS. 5A to 5C, respectively, illustrating a state in which a tire steering angle (δ or δ+α), a turning moment, and a yaw rate are generated.

FIGS. 5A and 6A illustrate a case in which a vehicle speed is low and the turning radius R is relatively large. In this case, the roll rate and the roll angle are relatively small, and the degradation of the ride comfort due to the roll of the vehicle does not particularly occur.

In FIGS. 5B and 6B, a turning moment Mg is generated only by the active steering system. In this case, by obtaining the tire sliding angle, the tire lateral force is generated and the lateral acceleration is also generated. The lateral acceleration is proportional to the roll rate and the roll angle, and excessive turning assist by the active steering system affects the roll motion of the vehicle, leading to degradation of the ride comfort. As described above, when the tire sliding angle is increased in the steering operation and turning is performed, the roll angle and the roll rate are increased, leading to degradation of the ride comfort.

On the other hand, in FIGS. 5C and 6C, a part of the turning moment Mg illustrated in FIG. 5B is generated by the left-and-right independent braking/driving force control of the rear wheels. Therefore, the tire steering angle δ in FIG. 6C is less than the tire steering angle δ+α in FIG. 6B. In this case, because the lateral acceleration does not occur due to the left-and-right independent braking/driving force control of the rear wheels, the roll rate and the roll angle can be restrained as compared with the case in FIGS. 5B and 6B.

From the above viewpoints, in the present example, in the electric vehicle that includes the active steering system and is capable of left-and-right independent braking/driving force traveling control of rear wheels, with respect to a target yaw rate obtained from steering by a vehicle state being calculated from an onboard sensor according to a vehicle model, a roll rate change rate is obtained from a roll rate generated when the target is achieved by steering and a roll rate at which a passenger feels uncomfortable, and torque vectoring control by rear left and right motors is performed based on the change rate, thereby achieving the target yaw rate and improving ride comfort performance.

Figure 7:
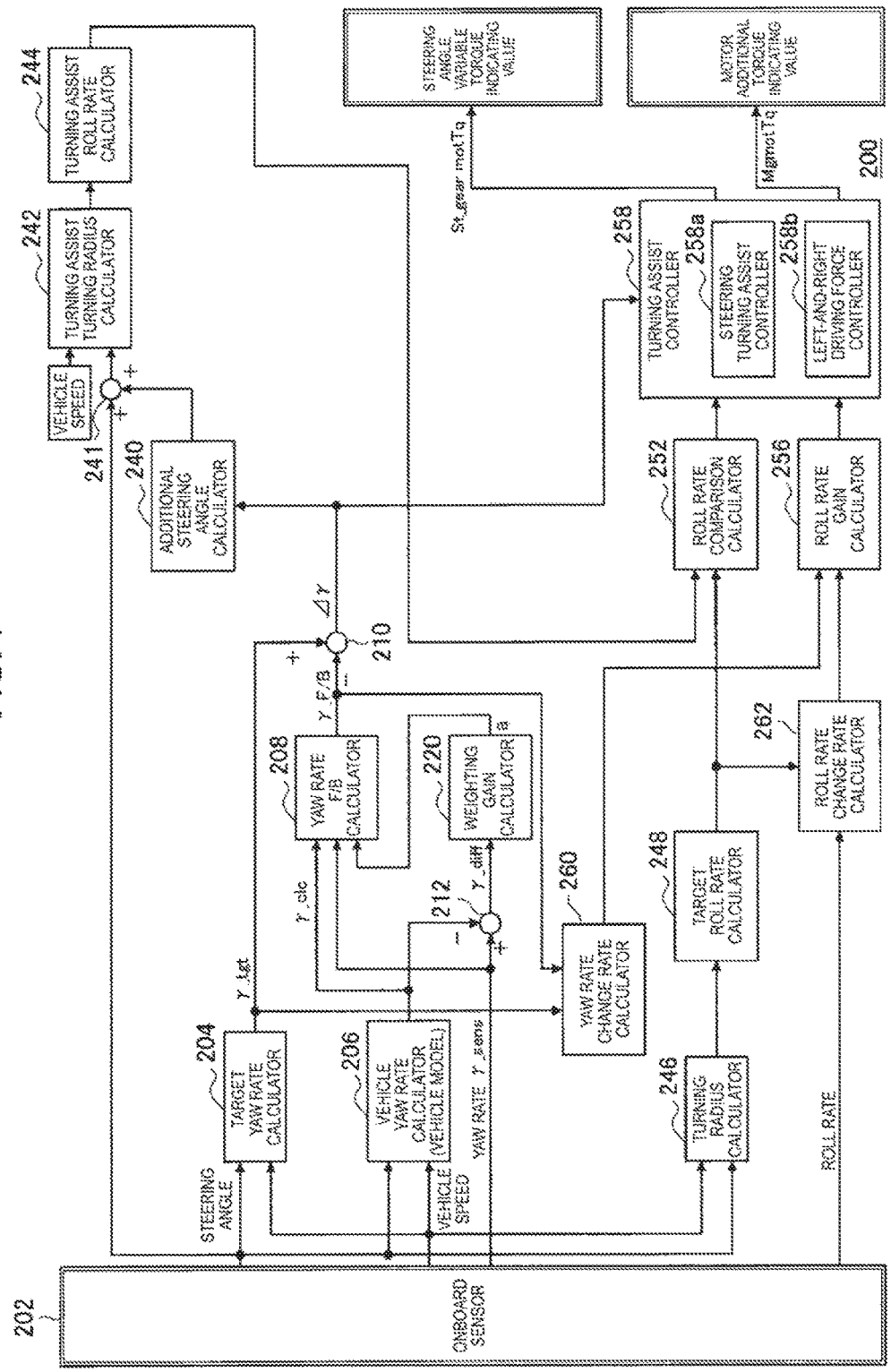
FIG. 7 is a schematic diagram illustrating structures of a control unit and surrounding components according to the present example in detail.

FIG. 7 is a schematic diagram illustrating structures of a control unit 200 and surrounding components according to the present example in detail. The control unit 200 includes an onboard sensor 202, a target yaw rate calculator 204, a vehicle yaw rate calculator (vehicle model) 206, a yaw rate F/B calculator 208, subtractors 210 and 212, a weighting gain calculator 220, a vehicle additional yaw moment calculator 230, an additional steering angle calculator 240, an adder 241, a turning assist turning radius calculator 242, a turning assist roll rate calculator 244, a turning radius calculator 246, a target roll rate calculator 248, a roll rate comparison calculator 252, a roll rate gain calculator 256, a turning assist controller 258, a yaw rate change rate calculator 260, a roll rate change rate calculator 262, a steering gear ratio variable torque indicator 270, and a motor request torque indicator 272. The turning assist controller 258 includes a steering turning assist controller 258a and a left-and-right driving force controller 258b.

In FIG. 7, the onboard sensor 202 includes the wheel speed sensors 127 and 128, the longitudinal acceleration sensor 132, the lateral acceleration sensor 134, the steering wheel angle sensor 138, the yaw rate sensor 142, the accelerator opening degree sensor 146, and the roll rate sensor 148, all of which have been mentioned above. The steering wheel angle sensor 138 measures the steering wheel angle θh of the steering wheel 130. In addition, the yaw rate sensor 142 measures the actual yaw rate γ of the vehicle 1000, and the wheel speed sensors 127 and 128 measure the vehicle velocity V. The lateral acceleration sensor 134 measures the lateral acceleration Ay of the vehicle 1000.

Figure 8:
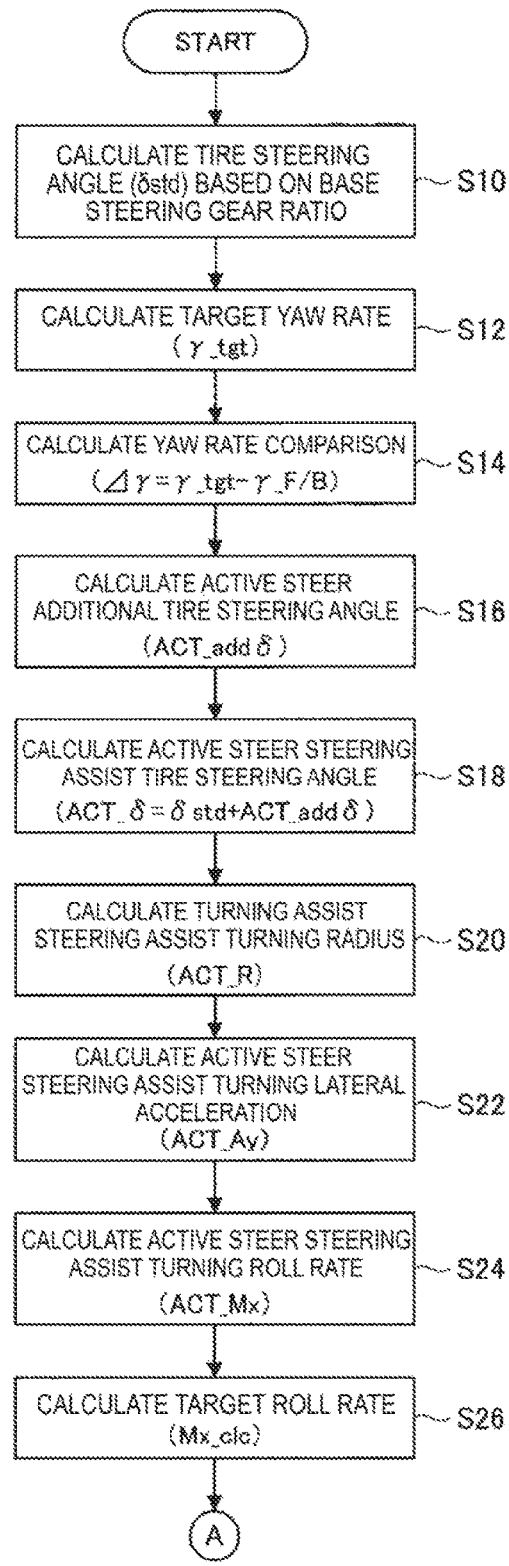
FIG. 8 is a flowchart illustrating processing performed by a control unit.
Figure 9:
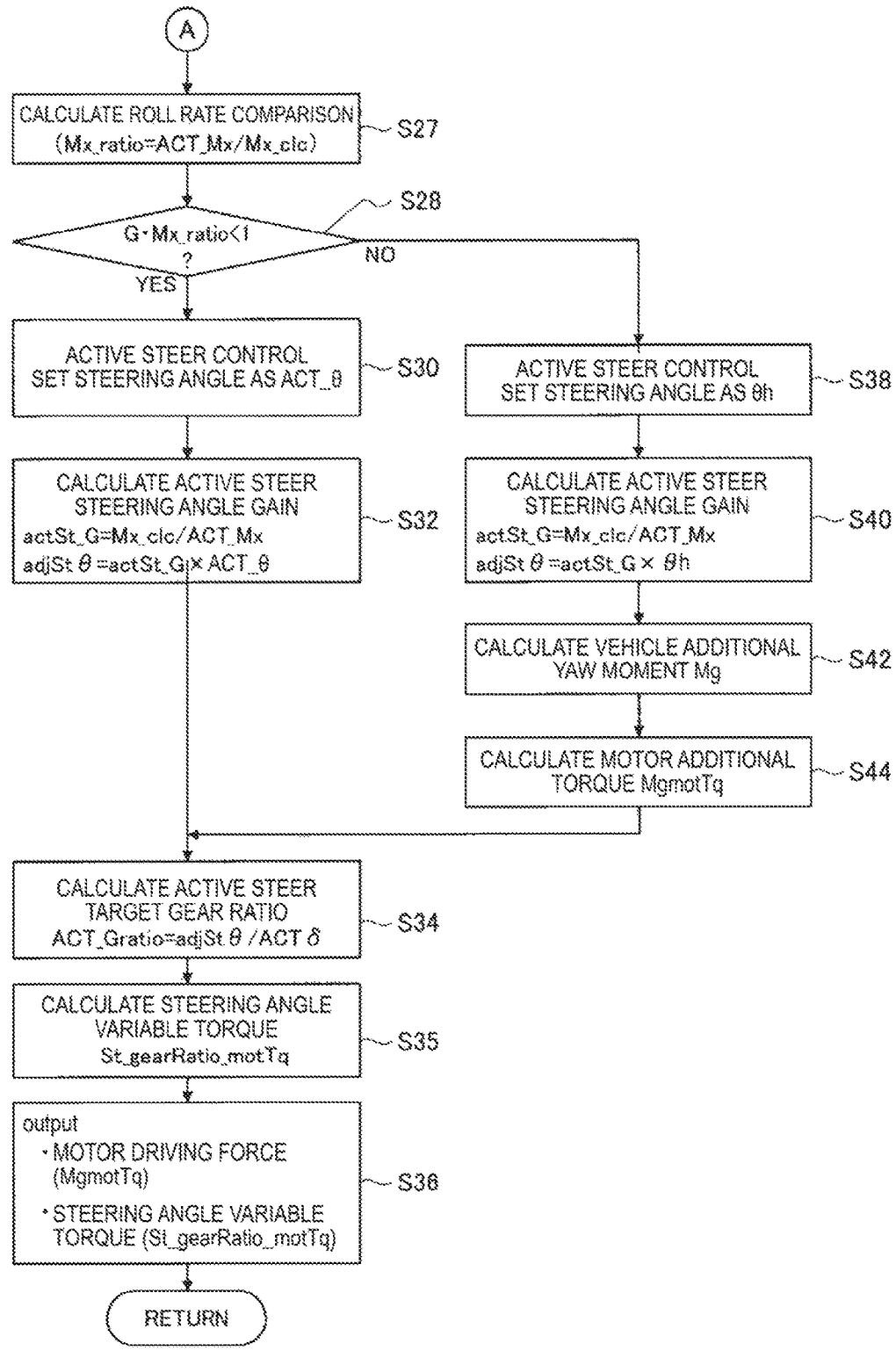
FIG. 9 is a flowchart illustrating processing performed by a control unit.

FIGS. 8 and 9 are flowcharts illustrating processing performed by the control unit 200. Hereinafter, processing performed by the control unit 200 will be described in detail based on FIGS. 7 to 9. First, a tire steering angle δstd corresponding to a steering angle θh is calculated based on a base steering gear ratio St_Gboxratio_Std (Step S10 in FIG. 8). The tire steering angle δstd is obtained by dividing the steering angle θh by the base steering gear ratio St_Gboxratio_Std. Also, the base steering gear ratio St_Gboxratio_Std can be changed by the active steering system. The tire steering angle δstd is input to the adder 241.

The target yaw rate calculator 204 calculates a target yaw rate γ_tgt based on the steering wheel angle θh and the vehicle velocity V (step S12 in FIG. 8). More specifically, the target yaw rate calculator 204 calculates the target yaw rate γ_tgt using eq. (1) below, which represents a common two-dimensional two-wheel model. The target yaw rate γ_tgt is calculated by substituting values calculated from Eqs. (2) and (3) below into the right side of Eq. (1). The calculated target yaw rate γ_tgt is input to the subtractor 210.

$$\gamma\_tgt = \frac{1}{1+TS} \times G_\delta^\gamma(0)_{tgt} \times \frac{\theta h}{N} \quad (1)$$

$$G_\delta^\gamma(0)_{tgt} = \frac{1}{1+A_{tgt}V^2} \times \frac{V}{l} \quad (2)$$

$$A_{tgt} = \frac{m}{2l} \times \frac{l_f \times K_{ftgt} + l_r \times K_{rtgt}}{K_{ftgt} \times K_{rtgt}} \qquad (3)$$

Note that the variables, the constants, and the operator in Eqs. (1) to (3) are as follows.

γ_tgt: the target yaw rate
θh: the steering wheel angle
V: the vehicle velocity
T: a time constant of the vehicle
S: a Laplace operator
N: a steering gear ratio
I: a vehicle wheelbase
$l_f$: the distance from the center of gravity of the vehicle to a front wheel center
$l_r$: the distance from the center of gravity of the vehicle to a rear wheel center
m: the weight of the vehicle
$K_{ftgt}$: target cornering power (the front wheels)
$K_{rtgt}$: target cornering power (the rear wheels)

As shown above, the target yaw rate γ_tgt is calculated from Eq. (1) with the vehicle velocity V and the steering wheel angle θh (=θh/N) as the variables. The constant Atgt in Eq. (2) is a constant that represents characteristics of the vehicle, and is calculated from Eq. (3).

The vehicle yaw rate calculator 206 calculates a yaw rate model value γ_clc using the following equations for calculating the vehicle yaw rate. More specifically, the yaw rate model value γ_clc (i.e., γ in Eqs. (4) and (5)) is calculated by substituting the vehicle velocity V and the steering wheel angle θh into Eqs. (4) and (5) below and solving Eqs. (4) and (5) simultaneously. In Eqs. (4) and (5), Kf represents cornering power (front) and Kr represents cornering power (rear). In eq. (3), the target cornering powers Kftgt and Krtgt, which are different from the cornering powers Kf and Kr in Eqs. (4) and (5), are used to make the target yaw rate γ_tgt greater than the yaw rate model value γ_clc to enhance the turning performance. The yaw rate model value γ_clc is input to the yaw rate F/B calculator 208. In addition, the yaw rate model value γ_clc is input to the subtractor 212.

$$2K_f \frac{\theta h}{N} = mV \frac{d}{dt}\beta + 2(K_f + K_r)\beta + \left\{mV + \frac{2}{V}(l_f K_f - l_r K_r)\right\}\gamma \qquad (4)$$

$$2l_f K_f \frac{\theta h}{N} = 2(l_f K_f - l_r K_r)\beta + I \frac{d}{dt}\gamma + \frac{2}{V}(l_f^2 K_f + l_r^2 K_r)\gamma \qquad (5)$$

Meanwhile, the subtractor 212 receives the actual yaw rate γ (hereinafter referred to as an actual yaw rate γ_sens) of the vehicle 1000 measured by the yaw rate sensor 142. The subtractor 212 subtracts the yaw rate model value γ_clc from the actual yaw rate γ_sens to obtain a difference γ_diff between the actual yaw rate γ_sens and the yaw rate model value γ_clc. The difference γ_diff is input to the weighting gain calculator 220.

The weighting gain calculator 220 calculates a weighting gain based on the difference γ_diff between the actual yaw rate γ_sens and the yaw rate model value γ_clc.

The yaw rate F/B calculator 208 receives the yaw rate model value γ_clc, the actual yaw rate γ_sens, and the weighting gain a. The yaw rate F/B calculator 208 weights both the yaw rate model value γ_clc and the actual yaw rate γ_sens using the weighting gain a, and calculates a feedback yaw rate γ_F/B based on Eq. (6) below. The calculated feedback yaw rate γ_F/B is output to the subtractor 210.

$$\gamma\_F/B = a \times \gamma\_clc + (1-a) \times \gamma\_sens \qquad (6)$$

Figure 10:
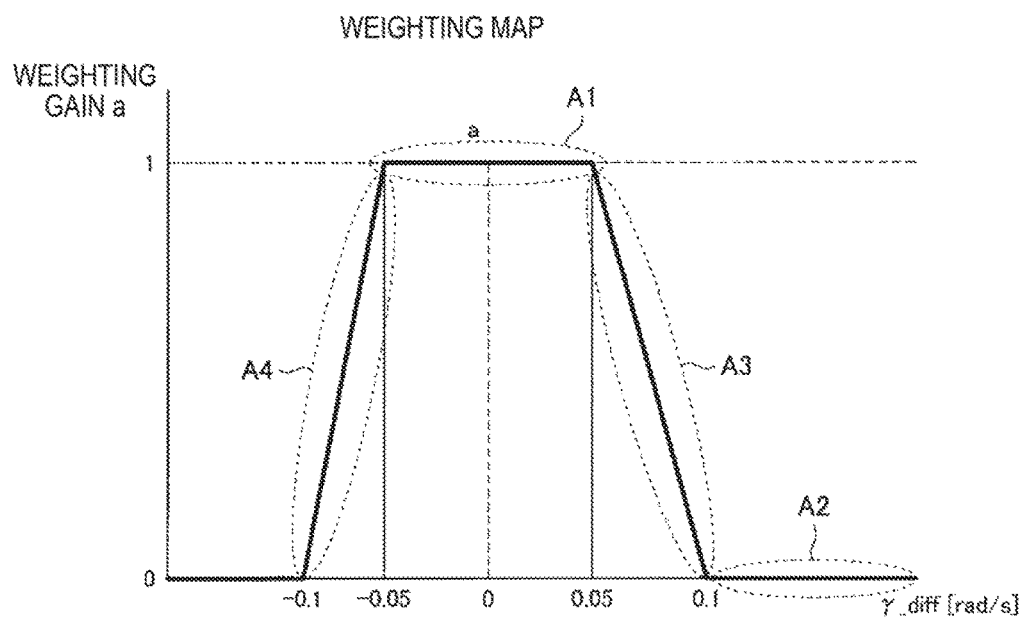

FIG. 10 is a schematic diagram illustrating a gain map used when the weighting gain calculator 220 calculates the weighting gain a. As illustrated in FIG. 10, the value of the weighting gain a varies between 0 and 1 in accordance with the reliability of the vehicle model. The difference (or deviation) γ_diff between the yaw rate model value γ_clc and the actual yaw rate γ_sens is used as an indicator of the reliability of the vehicle model. As illustrated in FIG. 10, the gain map is set such that the value of the weighting gain a increases as the absolute value of the difference γ_diff becomes smaller. The weighting gain calculator 220 performs a mapping process of FIG. 10 on the difference γ_diff to calculate the weighting gain a in accordance with the reliability of the vehicle model.

In FIG. 10, the weighting gain a is a value from 0 to 1 (0≤a<1). In the case of −0.05 [rad/s]≤γ_diff≤0.05 [rad/s], the weighting gain a is 1 (a=1).

In addition, in the case of 0.1<γ_diff, or γ_diff<−0.1, the weighting gain a is 0 (a=0).

In addition, in the case of 0.05 [rad/s]<γ_diff≤0.1 [rad/s], the weighting gain a is calculated using the following equation.

$$a = -20 \times \gamma\_diff + 2$$

In addition, in the case of −0.1 [rad/s]≤γ_diff<−0.05 [rad/s], the weighting gain a is calculated using the following equation.

$$a = 20 \times \gamma\_diff + 2$$

A region A1 in the gain map illustrated in FIG. 10, which is a region where the difference γ_diff approaches 0, is a region where the S/N ratio of the actual yaw rate γ_sens is low, or a region where tire characteristics exhibit linearity (e.g., when the road surface is dry). Therefore, in the region A1, the yaw rate model value γ_clc calculated by the vehicle yaw rate calculator 206 has a high degree of reliability. Accordingly, the value of the weighting gain a is determined to be 1, and the feedback yaw rate γ_F/B is calculated using Eq. (6) with a 100% distribution of the yaw rate model value γ_clc. This eliminates an effect of noise of the yaw rate sensor 142 contained in the actual yaw rate γ_sens, and is thus able to prevent any sensor noise from affecting the feedback yaw rate γ_F/B. This contributes to preventing a vibration of the vehicle 1000, leading to improved ride comfort.

Here, the difference between the actual yaw rate γ and the yaw rate model value γ_clc calculated from the vehicle model is caused by, for example, dynamic characteristics of the tires. The aforementioned two-dimensional two-wheel model assumes a region where the relationship (i.e., the cornering characteristics of the tires) between the lateral acceleration and slip angles of the tires exhibits linearity, and in this linear region, the actual yaw rate γ_sens and the yaw rate model value γ_clc substantially agree with each other. In the characteristic showing the relationship between the slip angle and the lateral acceleration, the region where the lateral acceleration exhibit linearity with respect to slip angles (region where a steering wheel operation speed is relatively low) is affected by noise of the yaw rate sensor 142. Accordingly, the yaw rate model value γ_clc is used in this region.

Meanwhile, in the region where the cornering characteristics of the tires exhibit nonlinearity, the yaw rate and the lateral acceleration of the actual vehicle vary nonlinearly with the steering angle or the slip angle, and a significant difference occurs between the yaw rate measured on the actual vehicle and the yaw rate of the two-dimensional two-wheel model. In such a transient nonlinear region, noise does not occur on account of the sensor characteristics of the yaw rate sensor 142, and the actual yaw rate γ_sens can therefore be used. Such a nonlinear region corresponds to, for example, a time at which the steering wheel is turned back. A case where the actual yaw rate γ exceeds the yaw rate model value γ_clc corresponds to the nonlinear region, and in this case, no sensor noise produces an effect, and the actual yaw rate γ can therefore be used to allow control based on the true value. Note that, while use of a model that allows for nonlinearity of the tires complicates the control based on the yaw rate, the reliability of the yaw rate model value γ_clc can be easily estimated based on the difference γ_diff, and the actual yaw rate γ can be used with a greater distribution in the nonlinear region in the present example. Moreover, in a region where the dynamic characteristics of the tires can produce no or limited influence, only the yaw rate model value γ_clc may be used.

Further, a region A2 in the gain map illustrated in FIG. 10, which is a region where the difference γ_diff has a large value, corresponds to, for example, a time when the vehicle is traveling on a wet road surface, a time when the vehicle is traveling on a snow-covered road, or a time when the vehicle is making a sharp turn, and is a marginal region in which the tires are sliding. In this region, the yaw rate model value γ_clc calculated by the vehicle yaw rate calculator 206 has a low degree of reliability, and the difference γ_diff has a greater value. Accordingly, the value of the weighting gain a is determined to be 0, and the feedback yaw rate γ_F/B is calculated using Eq. (6) with a 100% distribution of the actual yaw rate γ_sens. This contributes to ensuring sufficient precision of the feedback based on the actual yaw rate γ_sens, allowing feedback control of the yaw rate reflecting the behavior of the actual vehicle. A turn of the vehicle 1000 can thus be optimally controlled based on the actual yaw rate γ_sens. Moreover, in the region in which the tires are sliding, noise in a signal obtained by the yaw rate sensor 142 would not cause a vibration of the vehicle 1000 that can be perceived by the driver, and would not cause a significant reduction in ride comfort. The low μ region A2 illustrated in FIG. 10, for which the value of the weighting gain a is determined to be 0, may be set based on design requirements, or may be experimentally determined based on steering stability performance, ride comfort, and so on when the vehicle 1000 actually travels on a low μ road surface. Note that "μ" denotes a friction coefficient.

Furthermore, in a region A3 in the gain map illustrated in FIG. 10, which is a transitional region (a nonlinear region) from the linear region to the marginal region, the distributions of the yaw rate model value γ_clc and the actual yaw rate γ_sens (i.e., the value of the weighting gain a) are linearly varied while taking into account the tire characteristics of the actual vehicle 1000 as necessary. In the transitional region from the region A1 (i.e., a high μ region) to the region A2 (i.e., a low μ region), or from the region A2 (i.e., the low μ region) to the region A1 (i.e., the high μ region), the weighting gain a is calculated using linear interpolation to avoid a torque change and a yaw rate change caused by an abrupt change in the weighting gain a.

Furthermore, a region A4 in the gain map illustrated in FIG. 10 corresponds to a case where the actual yaw rate γ_sens is less than the yaw rate model value γ_clc. In the case where an incorrect parameter is input to the vehicle yaw rate calculator 206, and the yaw rate model value γ_clc is calculated incorrectly, for example, the actual yaw rate γ_sens can be used based on a map of the region A4 to perform control. Note that the range of the weighting gain a is not limited to the range of 0 to 1, and that any range of the weighting gain a that allows vehicle control may be adopted in other examples of the present invention without departing from the scope of the present invention.

The subtractor 210 subtracts the feedback yaw rate γ_F/B from the target yaw rate γ_tgt, which is an input from the target yaw rate calculator 204, to obtain a difference Δγ between the target yaw rate γ_tgt and the feedback yaw rate γ_F/B (step S14 in FIG. 8). That is, the difference Δγ is calculated from Eq. (7) below.

$$\Delta\gamma = \gamma\_Tgt - \gamma\_F/B \tag{7}$$

The difference Δγ is input to the additional steering angle calculator 240 and the turning assist controller 258 as a yaw rate correction amount.

The additional steering angle calculator 240 calculates an active steer additional tire steering angle ACT_addδ from Eq. (9) below based on the difference Δγ (Step S16 in FIG. 8).

$$\text{ACT\_add}\delta = (1 + AV^2) \times \frac{l}{V} \times \Delta\gamma \tag{9}$$

Further, the additional steering angle calculator 240 calculates an additional steering angle ACT_addθ based on the difference Δγ. Specifically, the additional steering angle ACT_addθ is calculated from Eq. (10) below by multiplying ACT_addδ by a steering gear ratio St_Gboxratio.

$$\text{ACT\_add}\theta = (1 + AV^2) \times \frac{l}{V} \times \text{St\_Gboxratio} \times \Delta\gamma \tag{10}$$

The calculated additional steering angle ACT_addθ and active steer additional tire steering angle ACT_addδ are values for compensating for deviation of an actual value from a target value of a yaw rate corresponding to the difference Δγ between the control target yaw rate γ_tgt and the feedback yaw rate γ_F/B. That is, the additional steering angle ACT_addθ and the active steer additional tire steering angle ACT_addδ correspond to a steering angle increase amount of the active steering corresponding to the vehicle additional yaw moment Mg.

The adder 241 adds the tire steering angle δstd and the active steer additional tire steering angle ACT_addδ and calculates an active steer steering assist tire steering angle ACT_δ (Step S18 in FIG. 8). That is, the active steer steering assist tire steering angle ACT_δ is obtained from Eq. (11) below. The active steer steering assist tire steering angle ACT_δ is obtained as a value that results from adding the active steer additional tire steering angle ACT_addδ by the active steering to the tire steering angle δstd according to the steering angle θh of the driver.

$$\text{ACT\_}\delta = \delta std + \text{ACT\_add}\delta \tag{11}$$

The turning assist turning radius calculator 242 calculates a turning assist steering assist turning radius ACT_R from Eq. (12) below based on the active steer steering assist tire steering angle ACT_δ (Step S20 in FIG. 8). The turning assist steering assist turning radius ACT_R corresponds to a vehicle turning radius when the steering angle is increased by the active steering.

$$\text{ACT\_}R = (1 + AV^2) \times \text{ACT\_}\delta \tag{12}$$

The turning assist roll rate calculator 244 calculates a roll rate during active steer steering assist. Therefore, first, the turning assist roll rate calculator 244 calculates a lateral acceleration during the active steer steering assist (an active steer steering assist turning lateral acceleration ACT_Ay) from Eq. (13) below based on the turning assist steering assist turning radius ACT_R (Step S22 in FIG. 8). The active steer steering assist turning lateral acceleration ACT_Ay corresponds to the lateral acceleration generated when the steering angle is increased by the active steer.

$$ACT\_Ay = \frac{V^2}{ACT\_R} \quad (13)$$

Further, the turning assist roll rate calculator 244 calculates a roll rate during active steer steering assist (an active steer steering assist turning roll rate ACT_Mx) from Eq. (14) below based on the active steer steering assist turning lateral acceleration ACT_Ay (Step S24 in FIG. 8). The active steer steering assist turning roll rate ACT_Mx corresponds to a roll rate generated when the steering angle is increased by the active steer.

$$ACT\_Mx = \frac{m_s \times h_s}{K_{\phi F} + K_{\phi R} - (m_s \times g \times h_s)} \frac{d}{dt}(ACT\_Ay) \quad (14)$$

The target roll rate calculator 248 calculates a target roll rate Mx_clc based on three Eqs. (15) below (Step S26 in FIG. 8). Here, the target roll rate calculator 248 first calculates a target lateral acceleration Ay based on a turning radius Re calculated from Eq. (15) below with the turning radius calculator 246. Then, the target roll rate calculator 248 calculates the target roll rate Mx_clc from Eq. (15) below based on the lateral acceleration Ay. The target roll rate Mx_clc corresponds to a roll rate according to the steering angle θh of the driver, i.e., a roll rate when the steering angle is not increased by the active steer. The steering angle θh is used as θ in Eq. (15). Further, in Eq. (15), ms indicates a vehicle mass [kg], hs indicates a roll center axis-center of gravity high-distance [m], KφF indicates a front roll rigidity [Nm/rad], $K_{\phi R}$ indicates a rear roll rigidity [Nm/rad], and g indicates the gravitational acceleration [m/s²].

$$Mx\_clc = \frac{m_s \times h_s}{K_{\phi F} + K_{\phi R} - (m_s \times g \times h_s)} \frac{d}{dt}(Ay) \quad (15)$$

$$Ay = \frac{V^2}{R_e}$$

$$R_e = (1 + AV^2)\frac{1}{\theta/St\_Gboxratio}$$

The roll rate comparison calculator 252 calculates a ratio Mx_ratio of the active steer steering assist turning roll rate ACT_Mx with respect to the target roll rate Mx_clc (Step S27 in FIG. 9). The ratio Mx_ratio is calculated from Eq. (16) below.

$$Mx\_ratio = ACT\_Mx/Mx\_clc \quad (16)$$

The turning assist controller 258 determines whether a value obtained by multiplying the ratio Mx_ratio by the roll rate gain G is less than 1 (Step S28 in FIG. 9). Although the roll rate gain G is set according to a motion change rate which will be described below, here, description will be given by first assuming that the roll rate gain G=1. That is, in this determination, whether the active steer steering assist turning roll rate ACT_Mx is greater than the target roll rate Mx_clc in the state in which the turning is not assisted is determined. Then, based on the determination result, whether to perform turning assist control only by the active steering or turning assist control by the active steer steering and left-and-right driving force control is determined. Then, based on the determination result, the turning assist controller 258 calculates a steering angle variable torque St_gearRatio_motTq by the active steering system and a left-and-right wheel motor torque MgmotTq. When the value of the ratio Mx_ratio is less than 1, because the active steer steering assist turning roll rate ACT_Mx is less than the target roll rate Mx_clc, the turning assist by the left-and-right-wheel motor does not have to be performed to restrain the roll rate. Therefore, the steering turning assist controller 258a of the turning assist controller 258 sets an active steering control steering angle corresponding to the active steer steering assist tire steering angle ACT_δ as ACT_θ (Step S30 in FIG. 9). The active steering control steering angle ACT_δ is obtained corresponding to the active steer steering assist tire steering angle ACT_δ by the steering gear ratio St_Gboxratio from the active steer steering assist tire steering angle ACT_δ and the active steering system (ACT_δ=St_Gboxratio/ACT_θ).

Further, the steering turning assist controller 258a of the turning assist controller 258 calculates an active steer steering angle gain actSt_G based on Eq. (17) below (Step S32 in FIG. 9). It is assumed that 0≤actSt_G≤1. The active steer steering angle gain actSt_G is expressed as the ratio of the target roll rate Mx_clc to the active steer steering assist turning roll rate ACT_Mx. Turning is performed based on the steering angle when turning with steering, and turning is performed with a driving force [N] when turning with the left-and-right driving force control. Because robustness and a calculation load increase when substitution calculation is performed from the steering angle to the driving force, distribution is changed by the gain. Further, the steering turning assist controller 258a calculates an adjusted steering angle adjStθ from Eq. (18) below based on the active steer steering angle gain actSt_G and the active steering control steering angle ACT_θ.

$$actSt\_G = Mx\_clc/ACT\_Mx \quad (17)$$

$$adjSt\theta = actSt\_G \times ACT\_\theta \quad (18)$$

The active steer target gear ratio ACT_Gratio is calculated from Eq. (19) below based on adjStθ and ACT_δ (Step S34 in FIG. 9). In the case of proceeding from Step S28 to Step S30, because Mx_ratio<1, the value of actSt_G is 1, which is the upper limit value (actSt_G=1). Therefore, the active steer target gear ratio ACT_Gratio is the ratio of ACT_θ to ACT_δ, and the calculated value is inherited as an assist gain of active steering.

$$ACT\_Gratio = adjSt\theta/ACT\_\delta \quad (19)$$

Figure 11:
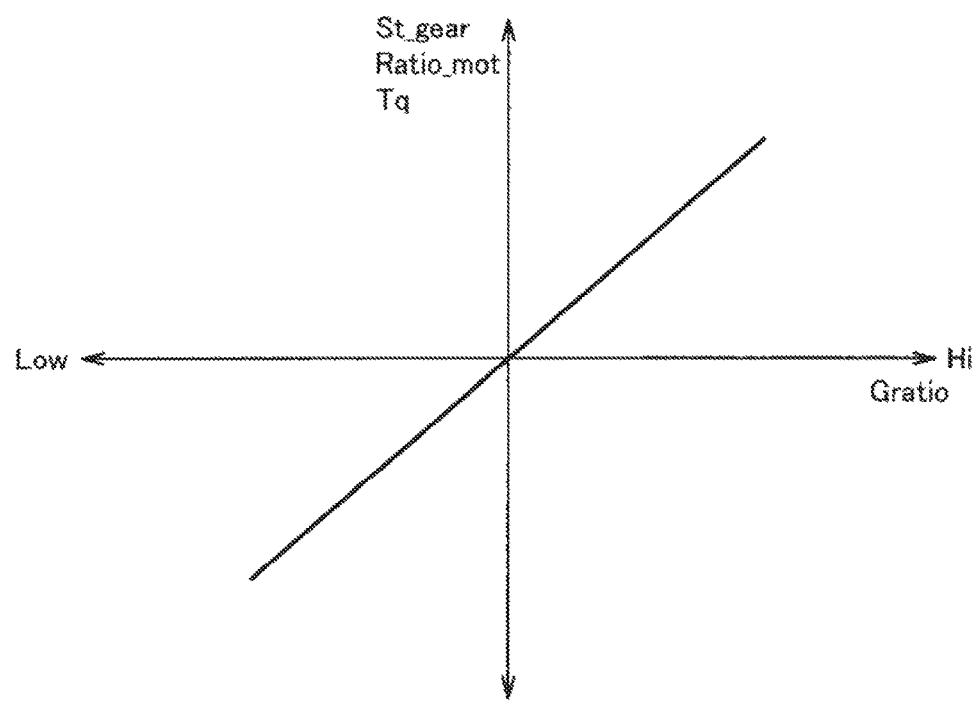
FIG. 11 is a schematic diagram illustrating a map in which a relationship between an active steer target gear ratio ACT_Gratio and a steering angle variable torque St_gearRatio_motTq is defined.

FIG. 11 is a schematic diagram illustrating a map in which a relationship between the active steer target gear ratio ACT_Gratio and the steering angle variable torque St_gearRatio_motTq is defined. The steering turning assist controller 258a obtains the steering angle variable torque St_gearRatio_motTq by applying the active steer target gear ratio ACT_Gratio to the map in FIG. 11 (Step S35 in FIG. 9). By the steering angle variable torque St_gearRatio_motTq being adjusted according to the value of ACT_Gratio, a desired active steer additional tire steering angle ACT_addδ is generated even when the active steering control steering angle ACT_θ is decreased by a driver's operation. Also, when the value of the ratio Mx_ratio is less than 1, because turning by the left-and-right driving force control is not performed, the motor torque MgmotTq is not calculated. Thus, in Step S36, the steering angle variable torque St_gearRatio_motTq is output. Then, the electric power steering motor 1060 is driven with the steering angle variable torque St_gearRatio_motTq as an indicating value.

In addition, when the value of the ratio Mx_ratio is 1 or larger, the process proceeds from Step S28 to Step S38 in FIG. 9. In this case, because the active steer steering assist turning roll rate ACT_Mx generated when the steering angle is increased by the active steer becomes greater than the target roll rate Mx_clc according to the steering angle θh of the driver, turning assist by the left-and-right driving force control is performed. In Step S38, the steering turning assist controller 258*a* sets an active steering control steering angle as the steering angle θh of the driver. That is, in this case, turning assist by the active steering system is not performed. In addition, the steering turning assist controller 258*a* obtains the active steer steering angle gain actSt_G from Eq. (17) and calculates adjStθ from Eq. (20) below based on the active steer steering angle gain actSt_G and the active steering control steering angle θh (Step S40 in FIG. 9). In the case in which the process proceeds from Step S28 to Step S38, because Mx_ratio≥1, the value of actSt_G is less than 1. By handling actSt_G as a gain and multiplying the steering angle θh by actSt_G, the steering angle can be decreased. Thus, when the roll rate is increased due to turning by steering, by decreasing the steering angle and performing turning assist by left-and-right driving force distribution control, the roll rate can be decreased while turning performance is maintained.

$$adjSt\theta = actSt\_G \times \theta h \quad (20)$$

When the value of the ratio Mx_ratio is 1 or larger, the vehicle additional yaw moment Mg calculated by the vehicle additional yaw moment calculator 230 is generated by the left-and-right braking/driving force of the rear wheels instead of the active steering system. Therefore, the left-and-right driving force controller 258*b* of the turning assist controller 258 calculates a vehicle additional yaw moment ΔMg corresponding to the difference Δγ from Eq. (21) below based on the difference Δγ (Step S42 in FIG. 9).

$$\Delta Mg[Nm] = I \times \frac{d}{dt}\Delta\gamma + \frac{2}{V}(l_f^2 \times K_f + l_\gamma^2 \times K_\gamma) \times \Delta\gamma \quad (21)$$

In addition, the left-and-right driving force controller 258*b* calculates a motor additional torque MgmotTq from Eq. (22) below based on the vehicle additional yaw moment ΔMg (Step S44 in FIG. 9). In Eq. (22), TrdR is a tread width of the rear wheels 104 and 106. Also, TireR is a tire radius of the front wheels 100 and 102 and the rear wheels 104 and 106, and GboxRatio is a gear ratio of the gearboxes 120 and 122 of the rear wheels 104 and 106.

$$MgmotTq[Nm] = \frac{\Delta Mg[Nm]}{TrdR[m]/2} \times TireR[m] \times \frac{1}{GboxRatio} \quad (22)$$

In the case in which the value of the ratio Mx_ratio is 1 or larger, like the case in which the value of the ratio Mx_ratio is less than 1, the steering angle variable torque St_gearRatio_motTq is calculated based on adjStθ (Steps S34 and S35 in FIG. 9). Here, ACT_θ in Eq. (18) is substituted by the steering angle θh to perform the calculation. From this, in Step S36, the motor additional torque MgmotTq obtained in Step S44 and the steering angle variable torque St_gearRatio_motTq obtained in Step S35 are output. Then, the electric power steering motor 1060 is driven with the steering angle variable torque St_gearRatio_motTq as an indicating value. Also, the motors 112 and 114 of the rear wheels 104 and 106 are driven with the motor additional torque MgmotTq as an indicating value. By the control described above, when the process proceeds from Step S28 to Step S38, because the yaw rate corresponding to the difference Δγ is generated by the motor additional torque MgmotTq, assist by the active steering is decreased, and thus the roll rate can be decreased.

Hereinafter, a method of calculating the roll rate gain G used in Step S28 in FIG. 9 will be described. The yaw rate change rate calculator 260 calculates a ratio of the feedback yaw rate γ_F/B to the target yaw rate γ_tgt. The roll rate change rate calculator 262 calculates a ratio of sensed value Mx_sens of the roll rate sensor 148 to the target roll rate Mx_clc. The roll rate gain calculator 256 calculates a motion change rate having the roll rate change rate as a denominator and the yaw rate change rate as a numerator. That is, the motion change rate is calculated by Eq. (23) below.

$$\text{Motion change rate} = ((\gamma\_F/B)/\gamma\_tgt)/(Mx\_sens/Mx\_clc) \quad (23)$$

Figure 12:
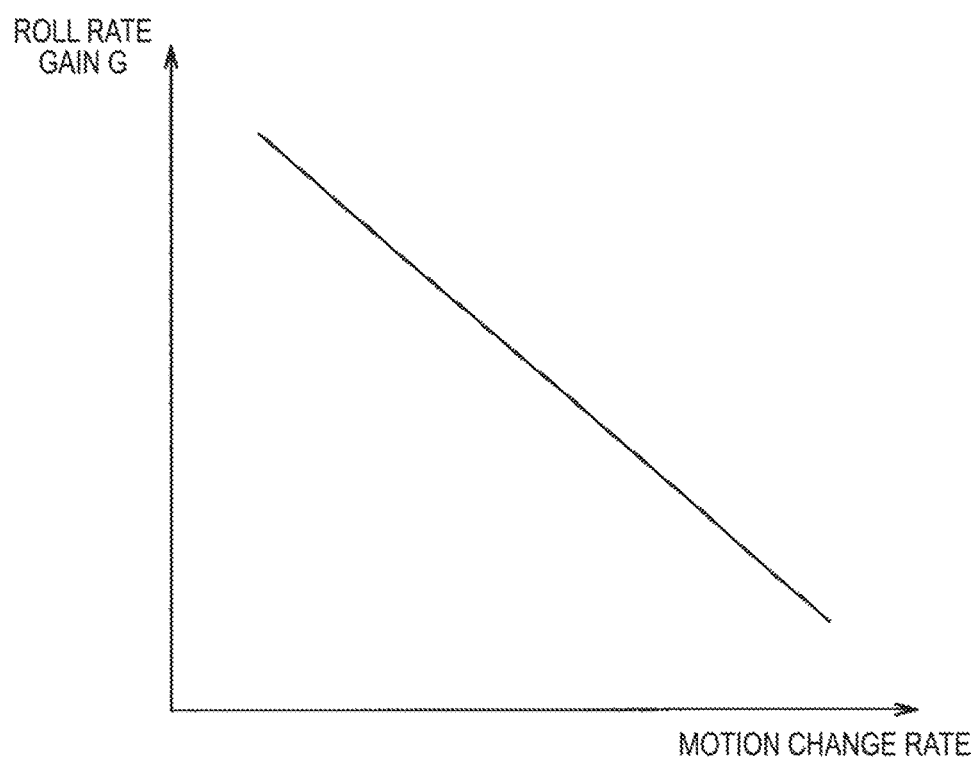
FIG. 12 is a schematic diagram illustrating a map in which a relationship between a motion change rate and a roll rate gain G is defined.

FIG. 12 is a schematic diagram illustrating a map in which a relationship between a motion change rate and a roll rate gain G is defined. The roll rate gain calculator 256 calculates the roll rate gain G from the map in FIG. 12 based on the motion change rate. The roll rate gain G may be a value that is equal to or greater than 1.

The motion change rate is a ratio of a dimensionless yaw rate to a dimensionless roll rate. The roll rate increases with respect to the yaw rate as the motion change rate becomes smaller, and the roll rate gain G is increased according to the map in FIG. 12. From this, when the ratio Mx_ratio is multiplied by the roll rate gain G in Step S28 in FIG. 9, because a speed of proceeding from Step S28 to Step S38 is increased compared to the case in which G=1, turning assist by the left-and-right driving force control can be performed when the roll rate is greater than the yaw rate.

On the other hand, the yaw rate increases with respect to the roll rate as the motion change rate becomes larger, and the roll rate gain G is decreased according to the map in FIG. 12. From this, the speed of proceeding from Step S28 to Step S30 in FIG. 9 is increased, and turning assist by the active steering system can be performed when the yaw rate is greater than the roll rate.

When the roll rate gain G=1 in Step S28 in FIG. 9, a steering angle variable torque and a motor driving force are set by feed-forward control. On the other hand, when the roll rate gain G is changed, because the sensed value Mx_sens of the roll rate sensor 148 and a factor of the feedback yaw rate γ_F/B is included in the roll rate gain G, the steering angle variable torque and the motor driving force can be set by feedback control. Therefore, by varying the roll rate gain G, the steering angle variable torque and the motor driving force can be optimally controlled based on an actual vehicle behavior.

As described above, according to the present example, by controlling a steering gear ratio in an active steering system and a motor torque of left and right drive wheels, because the roll of a vehicle can be optimally controlled, both ride comfort and turning performance can be improved.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

As described above, according to the example of the present invention, in a vehicle equipped with an active steering system capable of changing a steering gear ratio, it is possible to improve drivability by optimally controlling the roll of the vehicle.

The invention claimed is:

1. A control unit for a vehicle that has an active steering system that changes a steering gear ratio between a steering angle of a steering wheel and a tire steering angle, the control unit comprising:
    a steering turning assist controller configured to control the steering gear ratio so that a yaw rate generated by the vehicle becomes a target yaw rate to assist a turning of the vehicle; and
    a left-right driving force controller configured to control, in left and right electric drive wheels which each add a yaw moment to a vehicle body independently of a steering system and are able to be independently driven, driving forces of the electric drive wheels so that the yaw rate generated by the vehicle becomes the target yaw rate based on a roll of the vehicle.

2. The control unit for a vehicle according to claim 1, wherein, when the roll of the vehicle is less than a predetermined condition, the steering turning assist controller controls the steering gear ratio so that an additional tire steering angle which corresponds to a difference between the yaw rate generated by the vehicle and the target yaw rate is added.

3. The control unit for a vehicle according to claim 2, wherein, when the roll of the vehicle is less than the predetermined condition, the left-right driving force controller does not generate a yaw rate by controlling the driving forces of the electric drive wheels.

4. The control unit for a vehicle according to claim 2, wherein, when the roll of the vehicle exceeds the predetermined condition, the steering turning assist controller controls the steering gear ratio so that a tire steering angle which corresponds to a steering angle of a driver is added.

5. The control unit for a vehicle according to claim 4, wherein, when the roll of the vehicle exceeds the predetermined condition, the left-right driving force controller generates a yaw rate by controlling the driving forces of the electric drive wheels.

6. The control unit for a vehicle according to claim 4, wherein when the roll of the vehicle exceeds the predetermined condition, the left-right driving force controller generates at least a part of a yaw rate by controlling the driving forces of the electric drive wheels, the yaw rate being attempted to be generated by the steering turning assist controller.

7. The control unit for a vehicle according to claim 5, wherein when the roll of the vehicle exceeds the predetermined condition, the left-right driving force controller generates at least a part of a yaw rate by controlling the driving forces of the electric drive wheels, the yaw rate being attempted to be generated by the steering turning assist controller.

8. The control unit for a vehicle according to claim 2, wherein the predetermined condition is a condition in which a value of a turning assist roll rate when a turning assist is performed by the steering turning assist controller is equal to or greater than a value of a target roll rate when no turning assist is performed by the steering turning assist controller.

9. The control unit for a vehicle according to claim 3, wherein the predetermined condition is a condition in which a value of a turning assist roll rate when a turning assist is performed by the steering turning assist controller is equal to or greater than a value of a target roll rate when no turning assist is performed by the steering turning assist controller.

10. The control unit for a vehicle according to claim 4, wherein the predetermined condition is a condition in which a value of a turning assist roll rate when a turning assist is performed by the steering turning assist controller is equal to or greater than a value of a target roll rate when no turning assist is performed by the steering turning assist controller.

11. The control unit for a vehicle according to claim 8, wherein the predetermined condition is a condition in which a value obtained by multiplying the value of the turning assist roll rate by a gain obtained from a ratio of a yaw rate to a roll rate of the vehicle is equal to or greater than the value of the target roll rate.

12. The control unit for a vehicle according to claim 9, wherein the predetermined condition is a condition in which a value obtained by multiplying the value of the turning assist roll rate by a gain obtained from a ratio of a yaw rate to a roll rate of the vehicle is equal to or greater than the value of the target roll rate.

13. The control unit for a vehicle according to claim 10, wherein the predetermined condition is a condition in which a value obtained by multiplying the value of the turning assist roll rate by a gain obtained from a ratio of a yaw rate to a roll rate of the vehicle is equal to or greater than the value of the target roll rate.

14. The control unit for a vehicle according to claim 11, wherein the gain is greater as the ratio is smaller.

15. The control unit for a vehicle according to claim 12, wherein the gain is greater as the ratio is smaller.

16. The control unit for a vehicle according to claim 13, wherein the gain is greater as the ratio is smaller.

17. A control method for a vehicle that has an active steering system capable of changing a steering gear ratio between a steering angle of a steering wheel and a tire steering angle, the control method comprising:
    controlling the steering gear ratio so that a yaw rate generated by the vehicle becomes a target yaw rate to assist a turning of the vehicle; and
    controlling, in left and right electric drive wheels which each add a yaw moment to a vehicle body independently of a steering system and are able to be independently driven, driving forces of the electric drive wheels so that the yaw rate generated by the vehicle becomes the target yaw rate based on a roll of the vehicle.

18. A control unit for a vehicle that has an active steering system that changes a steering gear ratio between a steering angle of a steering wheel and a tire steering angle, the control unit comprising:
    circuitry configured to
        control the steering gear ratio so that a yaw rate generated by the vehicle becomes a target yaw rate to assist a turning of the vehicle, in an active steering system which is able to change the steering gear ratio between a steering angle of a steering wheel and a tire steering angle, and control, in left and right electric drive wheels which each add a yaw moment to a vehicle body independently of a steering system and are able to be independently driven, driving forces of the electric drive wheels so that the yaw rate generated by the vehicle becomes the target yaw rate based on a roll of the vehicle.

\* \* \* \* \*